Feb. 1, 1927.

H. A. BREMER 1,616,176

VIBRATION ABSORBER FOR RADIOTUBES

Filed Nov. 7, 1925

Inventor:
Harry A. Bremer,
By Samuel N. Pond,
atty.

Patented Feb. 1, 1927.

1,616,176

UNITED STATES PATENT OFFICE.

HARRY A. BREMER, OF CHICAGO, ILLINOIS.

VIBRATION ABSORBER FOR RADIOTUBES.

Application filed November 7, 1925. Serial No. 67,513.

This invention relates to radio apparatus, and has reference more particularly to devices for improving the clarity of the tones delivered by loud speakers and other amplifiers by reducing or eliminating the disturbing effects on the tube filaments and other elements caused by sound wave and other vibrations affecting the tubes and their support.

It is well known that vibrations induced on the sub-base and the socket and tube supported thereby are transmitted to the filament and other elements and through the latter are magnified in the loud speaker, ear phone or other receiver, producing very unpleasant effects and marring the purity and clarity of the original tone. With a view to checking this, it has heretofore been proposed to interpose vibration absorbing cushions between the tube socket and the sub-base. This reduces the transmission of vibrations from the sub-base, but does not completely check the vibrations induced in the socket and tube.

The main object of my present invention is to provide a simple, practical and inexpensive attachment which will effectively absorb and dampen the vibrations set up in the tube and socket and, in one form herein shown, will also reduce the vibrations transmitted to the tube from the sub-base by avoiding a rigid connection of the tube with the sub-base.

A device embodying my invention in one practical form thereof is illustrated in the accompanying drawing, in which—

Figure 1:
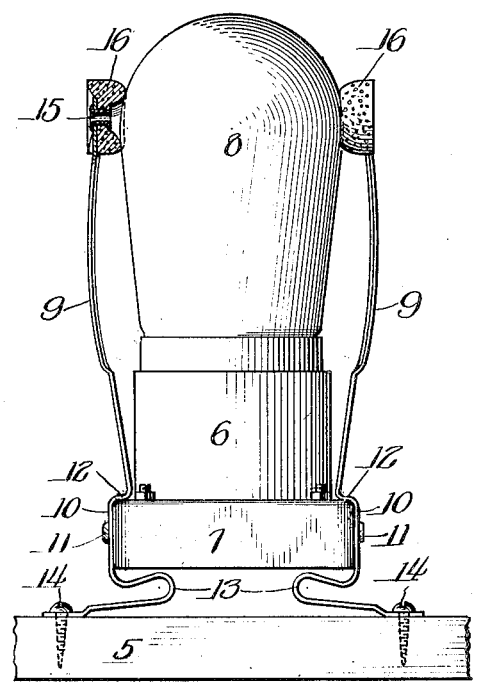
Fig. 1 is a side elevation of a tube, socket and a fragment of the sub-base, showing my improved vibration absorber applied thereto.
Figure 2:
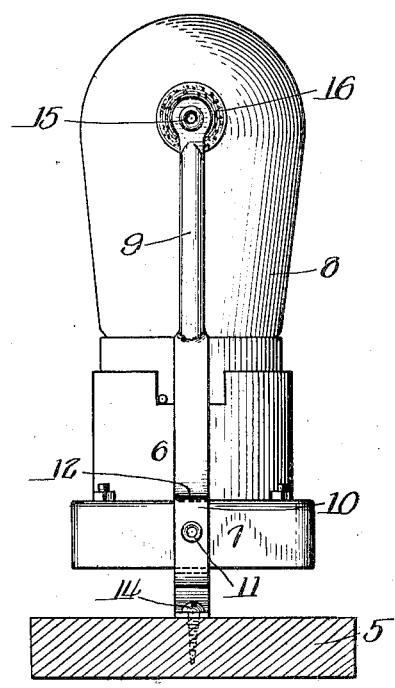
Fig. 2 is a similar view at right angles to that of Fig. 1.
Figure 3:
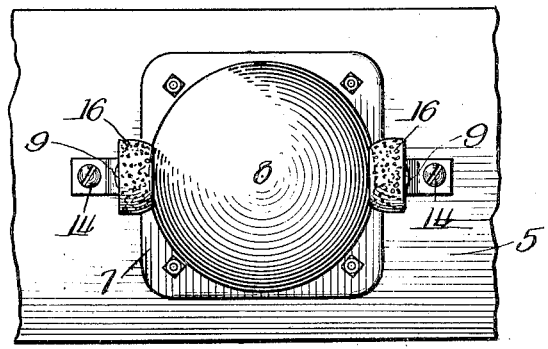
Fig. 3 is a top plan view.

Referring to the drawing, 5 designates the usual board supporting the tubes and commonly known as the sub-base. 6 designates the tube socket, 7 the socket base, and 8 the tube. 9 designates each of a pair of leaf springs that lie on opposite sides of the tube and socket 8, extending upwardly along the same. These springs are preferably formed with outwardly bent intermediate portions 10 which are attached to the socket base 7, as by screws 11, and also afford shoulders 12 resting on the upper margin of the base. Below the offset portions 10 the springs may be formed with inwardly extending loop portions 13 lying between the bottom of the socket base 7 and the top of the sub-base 5. The lower ends of the springs extend outwardly from beneath the socket base 7 and may be attached to the sub-base 5 as by screws 14.

To the upper ends of the springs 9 are secured, as by eyelets 15, pads 16 preferably of sponge rubber, the inner faces of which rest upon the tube 8 under the light spring pressure of the spring arms 9. Preferably, and as herein shown, the inner faces of the pads 16 are concaved, as shown at the left of Fig. 1, thereby providing an annular bearing of the pad on the tube.

By means of the device described, vibrations of the tube and its socket caused by extraneous sound waves are effectively arrested and absorbed by the pads 16, so that they are not transmitted to the filaments and other elements of the tubes and, as a consequence, the harsh, raucous and disagreeable effects created thereby in the loud speaker or other receiver are entirely avoided.

I have herein shown and described the tube as equipped with a pair of vibrations absorbing cushions, but manifestly a greater number may be employed if desired. The spring arms 9 carrying the cushions may, if desired, be attached only to the tube socket or to the sub-base, or at any other convenient point of attachment within the purview of the invention. But where the loop springs 13 are employed they serve to avoid a rigid connection of the tube and socket with the sub-base and thus reduce the extent of vibration transmitted by the latter.

While I have described the cushion 16 as of sponge rubber, it is manifest that felt, or any other soft vibration absorbing material may be employed in lieu thereof, within the principle and purview of the invention.

I claim—

1. The combination with a radio tube, and a socket supporting the same, of a plurality of spring arms attached at one end to a support, and pads of soft material attached to the free ends of said arms and pressed by the latter against the sides of the tube at diametrically opposed points above said socket.

2. The combination with a radio socket and tube, of a pair of spring arms attached at their lower ends to said socket and extending upwardly alongside of said tube, and pads of soft material attached to the upper ends of said arms and pressed by the latter against opposite sides of said tube.

3. The combination with a sub-base, a socket, and a radio tube, of a plurality of springs supporting said socket on said sub-base, a plurality of spring arms extending upwardly alongside of said tube, and pads of soft material mounted on said arms and pressed by the latter against said tube.

4. The combination with a sub-base, a socket, and a radio tube, of a pair of springs attached to said socket, said springs formed with loop-shaped portions lying between said socket and said sub-base and attached at their lower ends to the latter, and with upwardly extending arms lying alongside of said tube, and pads of soft material attached to said arms and pressed by the latter against said tube.

HARRY A. BREMER.